(12) United States Patent
Connell et al.

(10) Patent No.: US 9,436,970 B2
(45) Date of Patent: Sep. 6, 2016

(54) DISPLAY CO-PROCESSING

(71) Applicant: Google Technology Holdings LLC, Mountain View, CA (US)

(72) Inventors: Nathan M. Connell, Hawthorn Woods, IL (US); Christian L. Flowers, Chicago, IL (US); John W. Kaehler, Mundelein, IL (US); George B. Standish, Marengo, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 114 days.

(21) Appl. No.: 14/200,213

(22) Filed: Mar. 7, 2014

(65) Prior Publication Data

US 2014/0267316 A1 Sep. 18, 2014

Related U.S. Application Data

(60) Provisional application No. 61/792,668, filed on Mar. 15, 2013.

(51) Int. Cl.
| | |
|---|---|
| *G06T 1/20* | (2006.01) |
| *G06F 3/14* | (2006.01) |
| *G06F 1/32* | (2006.01) |
| *G06F 9/50* | (2006.01) |

(Continued)

(52) U.S. Cl.
CPC .............. *G06T 1/20* (2013.01); *G06F 1/3293* (2013.01); *G06F 3/14* (2013.01); *G06F 9/5044* (2013.01); *G09G 5/006* (2013.01); *G06F 3/1415* (2013.01); *G09G 5/005* (2013.01); *G09G 5/363* (2013.01); *G09G 2310/04* (2013.01); *G09G 2320/0673* (2013.01); *G09G 2330/021* (2013.01); *G09G 2340/12* (2013.01); *G09G 2360/06* (2013.01); *G09G 2360/18* (2013.01); *G09G 2370/10* (2013.01); *G09G 2370/20* (2013.01); *Y02B 60/121* (2013.01); *Y02B 60/142* (2013.01)

(58) Field of Classification Search
CPC ... G09G 5/363; G06F 1/3287; G06F 3/1431; G06F 3/1438; G06T 15/005; G06T 1/20
See application file for complete search history.

(56) References Cited

U.S. PATENT DOCUMENTS

| | | | |
|---|---|---|---|
| 2006/0061563 A1* | 3/2006 | Fleck | ..................... G06F 1/1616 345/211 |
| 2006/0103752 A1 | 5/2006 | Rai et al. | |

(Continued)

OTHER PUBLICATIONS

Lawrence, "High-speed serial interface for mobile displays", Proceedings of the 13th International Display Workshops, vol. 3, Dec. 6, 2006, 6 pages.

(Continued)

*Primary Examiner* — Todd Buttram

(57) ABSTRACT

In embodiments of display co-processing, a computing device includes a display, a full-power processor, and a low-power processor that can alter visual content presented by the display without utilizing the full-power processor. The low-power processor can, responsive to a request from the full-power processor, generate additional display data to update display data stored in a frame-buffer of the display. The low-power processor can then transmit the additional display data to the frame-buffer effective to alter at least a portion of the visual content presented by the display. In some embodiments, the additional display data is transmitted via a protocol converter that forwards the display data to the display using a display-specific communication protocol.

21 Claims, 8 Drawing Sheets

(51) Int. Cl.
  *G09G 5/00* (2006.01)
  *G09G 5/36* (2006.01)

(56) References Cited

U.S. PATENT DOCUMENTS

| | | |
|---|---|---|
| 2006/0212733 A1 | 9/2006 | Hamilton |
| 2007/0239921 A1 | 10/2007 | Toorians et al. |
| 2009/0002285 A1* | 1/2009 | Baba .................... G09G 3/3406 345/77 |
| 2009/0150945 A1* | 6/2009 | Park ................... H04N 7/17318 725/87 |
| 2009/0315899 A1 | 12/2009 | Pourbigharaz et al. |
| 2010/0161845 A1* | 6/2010 | Vyshetski ............... G06F 13/28 710/22 |
| 2010/0164968 A1 | 7/2010 | Kwa et al. |
| 2010/0268860 A1* | 10/2010 | Nikazm .................... G06F 3/00 710/105 |
| 2012/0310672 A1* | 12/2012 | Steusloff ................. G06F 3/002 705/3 |
| 2013/0002596 A1* | 1/2013 | Ke ........................ G06F 1/3203 345/173 |
| 2013/0102360 A1* | 4/2013 | Rofougaran ............. H04B 1/08 455/556.1 |
| 2013/0241938 A1* | 9/2013 | Gruber .................. G06T 15/005 345/501 |

OTHER PUBLICATIONS

International Search Report and Written Opinion for PCT Application No. PCT/US2014/028086, mailed Jul. 21, 2014, 17 pages.
International Preliminary Report on Patentability for PCT Application No. PCT/US2014/028086, mailed Sep. 24, 2015, 12 pages.

* cited by examiner

DISPLAY CO-PROCESSING

BACKGROUND

Many computing devices, such as mobile phones, tablet computers, laptop computers, and portable media devices, have integrated displays for presenting visual content. The visual content is typically rendered using a high-speed processing component, such as an application processor or dedicated graphics engine, and then transmitted to the integrated display for presentation. Relative to other components of a computing device, application processors and dedicated graphics engines consume considerable power. Most of these types of computing devices, however, draw power from battery-based supplies that provide limited amounts of power between charges. Continued or persistent presentation of visual content on an integrated display often keeps the power-hungry graphic components active, which increases power consumption of the computing device. This increased power consumption results in shortened run-times of the computing device or restricted use of the display when extended run-times are desired.

BRIEF DESCRIPTION OF THE DRAWINGS

Embodiments of display co-processing are described with reference to the following Figures. The same numbers may be used throughout to reference like features and components that are shown in the Figures.

DETAILED DESCRIPTION

Figure 1:
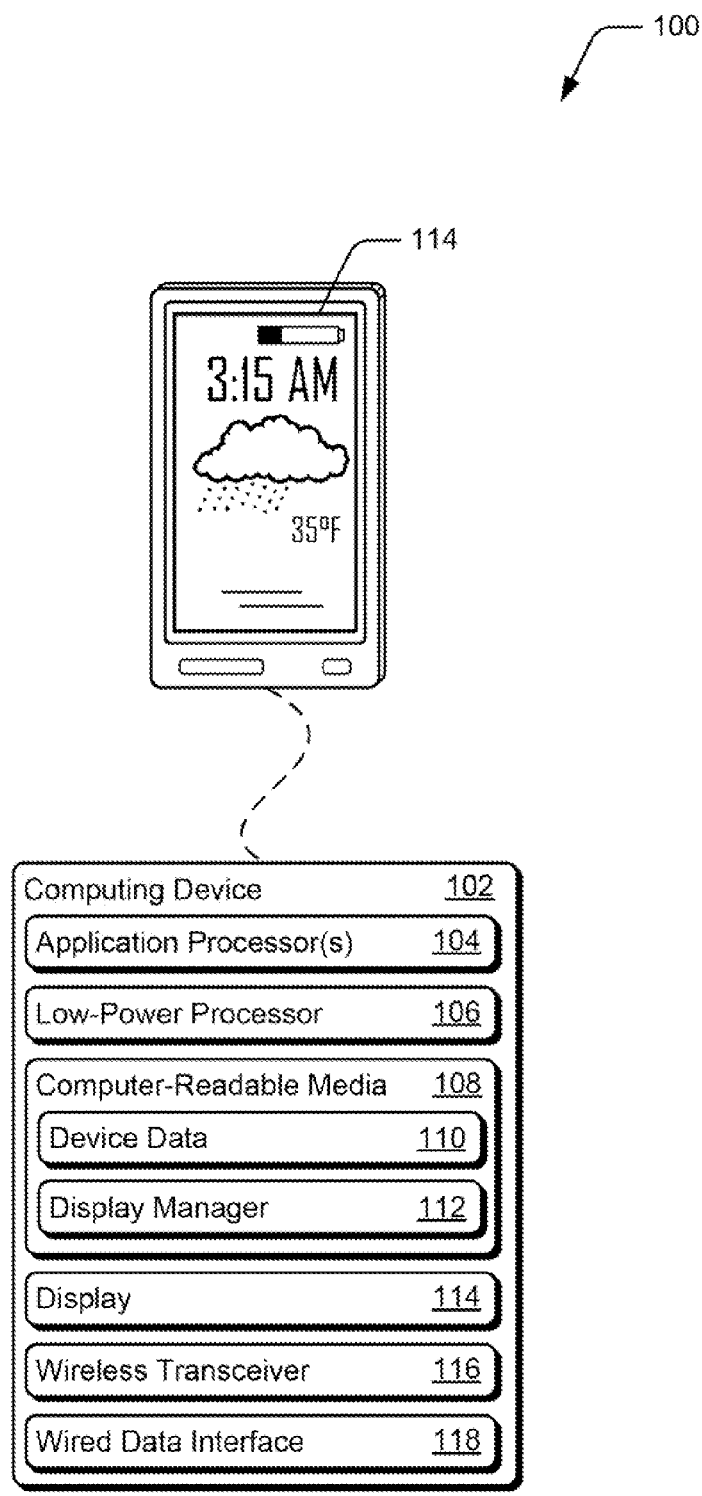
FIG. 1 illustrates an example system in which embodiments of display co-processing can be implemented.

In embodiments of display co-processing, a computing device includes a display, a full-power processor (e.g., application processor or graphics engine), and a low-power processor. Visual content associated with an application or operating system of the computing device is typically rendered by the full-power processor into display data (e.g., a frame). Once rendered, the display data is transmitted by a display-specific interface of the full-power processor to the display for presentation. At the display, the display data is stored in a frame buffer from which the display presents the display data as the visual content for user interaction and/or viewing. This process is repeated in rapid succession as the visual content is rendered, transmitted, and presented to enable the user interaction and viewing.

As described above, full-power processors, such as application processors and dedicated graphics engines, consume considerable power relative to other components of a computing device. This power consumption may shorten a run-time of the computing device or limit use of the display to extend device run-times. Embodiments of display co-processing enable a lower-power processor (e.g., microcontroller) to transmit additional display data to a display to effectively render visual content while a full-power processor remains in a low-power or sleep state. Permitting the full-power processor to remain in a low-power state reduces power consumption of the computing device, enabling longer device run-times or expanded use of the display for presenting visual content.

When a computing device enters a state of low graphical activity, such as a standby mode or audio playback mode, a refresh-frequency of visual content presented by the display decreases. During this state of low graphical activity, a low-power processor can be used to update at least a portion of the visual content presented by the display. An initial set of display data (e.g., a visual frame) may be rendered by a full-power processor and transmitted to the display for presentation. This initial set of display data is stored in a frame-buffer of the display from which the display data is decoded by logic of the display to produce the visual content. Once the initial set of data is stored in the frame-buffer of the display, a lower-power processor can update a portion of the display data to effectively render visual content.

By way of example, consider a smart-phone that enters a standby mode in which time and date information is presented on a display of the smart-phone. Display data for a background image and text for the time and date can be rendered by an application processor and transmitted to the display. Once the display data is stored in the frame-buffer of the display, the display can present the visual content (e.g., background image, weather icon, battery indicator, time, and/or date), and the application processor can enter a low-power state. The application processor, either prior to entering the low-power state or while in the low-power state, can transmit a request to a low-power processor to alter the visual content presented by the display. The low-power processor may then generate, based on the request or accessible parameters of display data, additional display data useful to alter the visual content. This additional display data can be written to the frame-buffer of the display effective to cause the display to present the altered visual content. This may allow visual content presented by the display to be altered effective to enable the presentation of meaningful, slow-changing graphics to a user without bringing the full-power processor out of the low-power state.

While features and concepts of the described display co-processing can be implemented in any number of different devices, systems, and/or configurations, embodiments of display co-processing are described in the context of the following example devices, systems, and methods.

FIG. 1 illustrates an example system 100 in which embodiments of display co-processing can be implemented. The example system 100 includes a computing device 102 that may be any type of portable electronic device, such as a smart-phone, mobile phone, tablet computer, handheld navigation device, portable gaming device, and/or portable media playback device. The computing device may also be any type of device as further described with reference to the example electronic device shown in FIG. 8. The computing device 102 (FIG. 1) includes an application processor 104 and a low-power processor 106. The application processor 104 may be configured as a single or multi-cored full-power processor that includes graphic rendering capabilities. These graphic rendering capabilities allow the application processor 104 to render graphic or display data at high frame rates, and may be provided by a dedicated graphics processing unit (GPU) associated with the application processor 104.

The low-power processor 106 may be configured as a low-power processor or micro-controller that is unable to fully render graphic or display data. In some cases, the low-power processor lacks an integrated display controller and/or a display-specific data interface. The low-power processor 106 may be implemented as a reduced-instruction set computing (RISC) processor which has a smaller instruction set, operates at a lower frequency, or has fewer processing capabilities than the application processor 104. For example, when the application processor 104 is configured as a multi-core full-power processor implementing a 32-bit instruction set, the low-power processor 106 may be configured as a RISC-based micro-controller that implements a 16-bit instruction set. The application processor 104 and/or low-power processor 106 may each be implemented separately as disparate components (shown), or implemented together as an application processor with integrated companion micro-controller (not shown).

The computing device 102 also includes computer readable-media 108 (CRM 108), which stores device data 110 of the computing device 102. The CRM 108 may include any suitable memory or storage device such as random-access memory (RAM), static RAM (SRAM), dynamic RAM (DRAM), non-volatile RAM (NVRAM), read-only memory (ROM), or Flash memory useful to store the device data 110. The device data 110 may include user data, multimedia data, applications and/or an operating system of the computing device 102, which are executable by the application processor 104 to provide various functionalities of the computing device 102.

The computing device 102 also includes a display manager 112, which, in one implementation, is embodied on the CRM 108 (as shown) as processor-executable instructions. Alternately or additionally, the display manager 112 may be implemented in whole or part as hardware logic or circuitry integrated with or separate from other components of the computing device 102 (e.g. the application processor 104 or low-power processor 106). An example implementation of the display manager 112 is described further with reference to FIG. 2. In at least some embodiments, the display manager 112 coordinates activities between the application processor 104 and the low-power processor 106.

The computing device 102 includes a display 114 for presenting visual content to users. The display 114 may be configured as any suitable type of display such as a liquid crystal display (LCD) or an active-matrix organic light-emitting diode (AMOLED) display. The visual content presented by the display 114 is based on display data received from other components of the computing device 102. This display data is typically received via a display-specific data interface of the display 114, such as a mobile industry processor interface (MIPI), mobile display digital interface (MDDI), DisplayPort, or embedded DisplayPort interface.

The computing device 102 is also capable of communicating data via a wireless transceiver 116 and/or a wired data interface 118. The wireless transceiver 116 may be configured for communication via one or more types of data networks, such as a wireless personal-area-network (WPAN), wireless local-area-network (WLAN), wireless wide-area-network (WWAN), or a cellular network. Example standards by which these networks communicate include IEEE 802.15 (Bluetooth™) standards, IEEE 802.11 (WiFi™) standards, 3GPP-compliant cellular standards, or various IEEE 802.16 (WiMAX™) standards.

The wired data interface 118 may be configured to support any suitable type of wired communication, such as a universal serial bus (e.g., USB 2.0 or USB 3.0), audio, Ethernet, peripheral-component interconnect express (PCI-Express), serial advanced technology attachment (SATA), and the like. In some embodiments, the wired data interface 118 may be operably coupled with a custom or proprietary connector which integrates multiple data interfaces, along with a power connection for charging the computing device 102.

Figure 2:
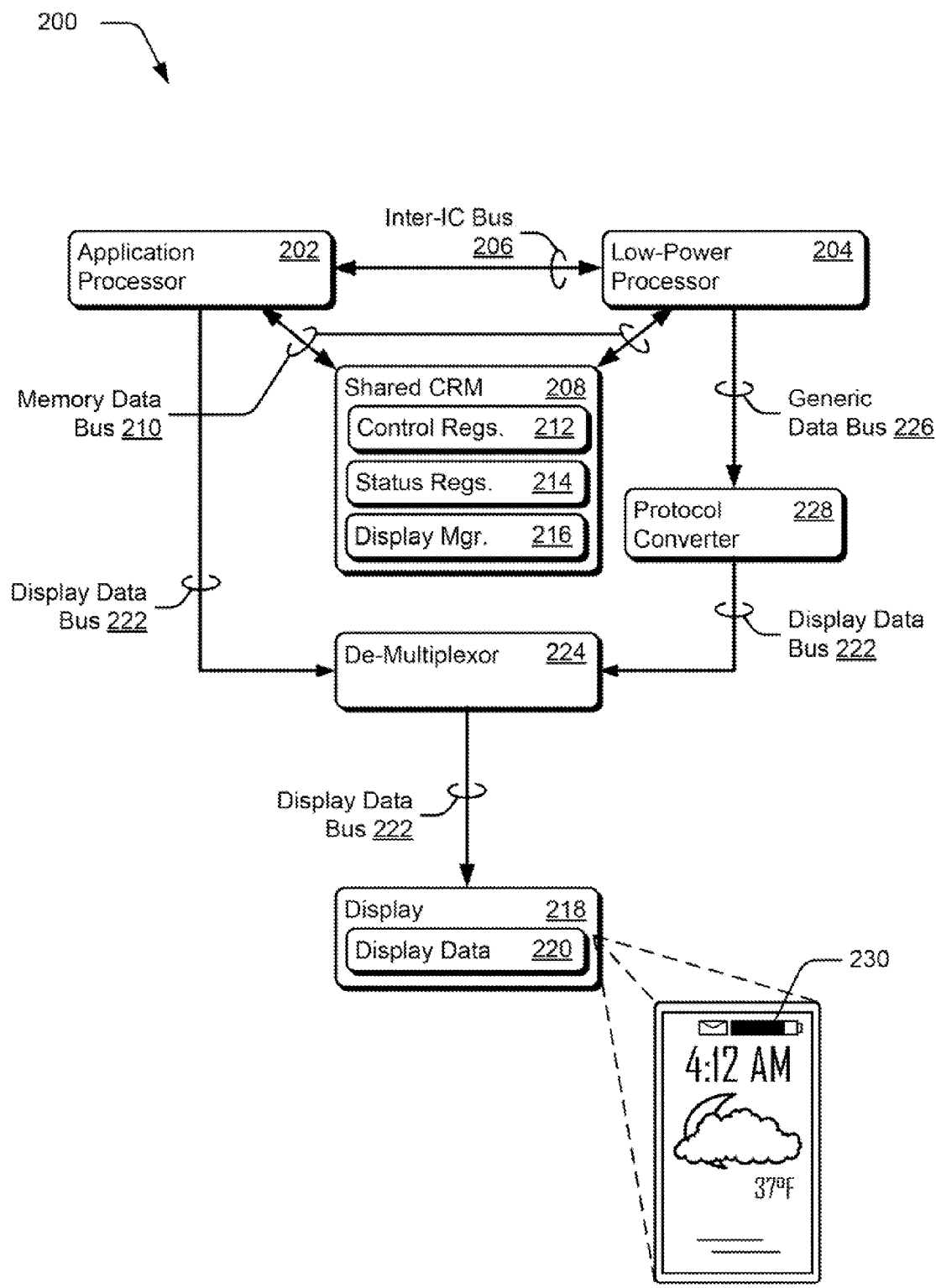
FIG. 2 illustrates various components of an example system that can implement embodiments of display co-processing.

FIG. 2 illustrates various components of an example system that can implement embodiments of display co-processing. As shown generally at 200, the components include an application processor 202 and a low-power processor 204, such as the application processor 104 and low-power processor 106 described with reference to FIG. 1. The application processor 202 can communicate data with the low-power processor 204 via an inter-integrated-circuit bus 206 (inter-IC bus 206) or shared computer-readable media 208 (shared CRM 208).

The inter-IC bus 206 may be configured as any suitable type of data bus, such as an inter-integrated circuit (I²C) compliant bus, IP-block cross bar, general purpose input/outputs (GPIOs), and the like. The application processor 202 and low-power processor 204 can access the shared CRM 208 via memory data bus 210, which may be implemented as separate data buses (e.g., multi-port RAM) or combined (not shown). Alternately or additionally, shared CRM 208 may reside, in whole or part, within one of the application processor 202 or the low-power processor 204.

The application processor 202 or low-power processor 204 may access contents of the shared CRM 208, such as the display co-processing control registers 212 (control regs. 212) and display co-processing status registers 214 (status regs. 214). These display co-processing registers 212, 214 can be utilized to support low-power handover and behavior between the application processor 202 and low-power processor 204. The shared CRM 208 may also include a display manager 216, such as the display manager 112 described with reference to FIG. 1. In this particular example, the display manager 216 is embodied on the shared CRM 208 as processor-executable instructions and/or data. Various aspects of the display manager 216 may be implemented by the application processor 202 or the low-power processor 204 when the processor-executable instructions are respectively executed by either processor.

The components also include a display 218, such as the display 114 described with reference to FIG. 1. Display 218 receives display data 220 from the application processor 202 or the low-power processor 204 via a display data bus 222. The display data bus 222 may be compliant with any suitable specification or standard, such as MIPI, MDDI, DisplayPort, or embedded DisplayPort. Generally, these specifications or standards define high-speed serial data channels and may also support a low-power back channel. To simplify connectivity with multiple processors, a de-multiplexor 224 (or similarly configured multiplexor) may be operably coupled between the display 218, application processor 202, and low-power processor 204.

In some embodiments, a protocol converter 228 is implemented between the low-power processor 204 and the de-multiplexor 224 to convert data transmitted via a generic data bus 226 by the low-power processor 204. The protocol converter 228 may be implemented using any suitable combination of software, firmware, and/or hardware, such as a programmable logic device (PLD), field-programmable gate array (FPGA), complex PLD (CPLD), programmable array logic (PAL), and the like.

In some cases, the low-power processor 204 lacks a dedicated display controller or display-specific data interface. In such cases, the low-power processor 204 transmits display data using a generic communication protocol. This generic communication protocol may be compliant with any suitable specification or standard, such as serial peripheral interface (SPI), system management bus (SMBus), or an I²C communication protocol. Alternately or additionally, the protocol converter 228 may emulate handshake signaling or data transfer control operations of a display-specific interface (e.g. MIPI data transfer initiation/termination).

Input selection of the de-multiplexor 224 may be controlled via any suitable signal, such as a GPIO signal of the application processor 202 or the low-power processor 204. In some embodiments, input selection of the de-multiplexor 224 may be controlled by a signal output from the protocol converter 228 such that input selection coincides with initiation or termination of a data transfer from the protocol converter 228 to the display 218.

When a computing device enters a state of low graphical activity, a refresh-frequency of visual content of the display 218 may decrease such that the low-power processor 204 can render the visual content. In some embodiments, the display manager 216 may determine when to transition control of, or access to, the display 218 from the application processor 202 to the low-power processor 204. Prior to entering a state of low graphical activity, the application processor 202 may render and transmit display data 220 to display 218 via the display data bus 222. The display can then present the display data as an entire frame of visual content, such as a background image, battery indicator, time, and date (e.g., display 114 of FIG. 1). In the context of this example, assume that the display data bus 222 is configured for MIPI compliant communication of display data (e.g. display bit interface (DBI-2) or display pixel interface (DPI-2)). In some embodiments, the display is configured to maintain the display data in a frame-buffer of the display while the display is in a low-power state. For example, the display may maintain or store the display data in the frame buffer responsive to receiving a MIPI Sleep_In command, at which point the display may enter its lowest power state.

The application processor 202 can then enter a low-power state to conserve power. In some cases, the low-power state may prevent the application processor 202 from rendering display data because doing so consumes considerable power. In such cases, the low-power state may also be the lowest-power state that permits the application processor 202 to execute background programs or applications, or provide display control data to the low-power processor 204.

The display manager 216 may then cause the application processor 202 to write data to the display control registers 212 that describes a desired alteration of the visual content presented by the display 218. The data may describe an alteration of a parameter of the visual content (e.g., brightness, luminosity, or gamma), timing information for performing the alteration, or a partial region of the display over which the alteration is to be performed. This data or control information may be used by the low-power processor 204 to render meaningful, slow changing visual content, such as "heartbeat" indications or other contextual alterations of the visual content (e.g., battery status or charge level). Heartbeat indications may for example comprise periodic display of information on an otherwise blank ("OFF") display panel. In this particular example, the alteration of the visual content may reflect a change in a charge level of a battery, such as a battery icon 230. Alternately or additionally, any of the graphics or icons illustrated in FIGS. 1 and/or 2 may be updated using various embodiments of display co-processing. It is envisioned that the visual content may include displaying received email or text message alerts, meeting notice alerts, or other content pertaining to the communication device while the device is in a lower power state.

Once the data is written to the display control registers 212, the display manager 216 transfers control of the display 218 to the low-power processor 204. The display manager 216 may do so by sending a wake request or notification to the low-power processor 204, such as through a general purpose input/output (GPIO) of the application processor 202. Alternately or additionally, the display manager 216 switches the input selection of the de-multiplexor 224 to receive data from the low-power processor 204 instead of the application processor 202. The low-power processor 204 then generates additional display data based on the data stored in the display control registers 212. This additional display data may not be sufficient to over-write an entire frame-buffer of the display 218, yet may be useful to alter at least a portion of the visual content presented by the display 218. The low-power processor 204 then transmits the additional display data to the protocol converter 228 via the generic data bus 226. Assume in the context of this example, that the generic data bus 226 is configured as an SMBus and that a data port of the low-power processor 204 is configured for SMBus compliant communication.

The protocol converter 228 then converts the additional display data from the SMBus format to a display-specific communication protocol, in this case to MIPI compliant display data. The additional display data is then transmitted by the protocol converter 228 to the display 218 via the de-multiplexor 224. Once received by the display 218, the additional display data is written into the display data 220 effective to alter the visual content presented by the display 218. Having altered the visual content presented by display 218, low-power processor 204 can update the display status registers 214 to track a current state of alterations of the visual content. The application processor 202 may also access the display status registers 214 to determine whether the low-power processor successfully altered the visual content or to determine whether to request further alterations.

Figure 3:
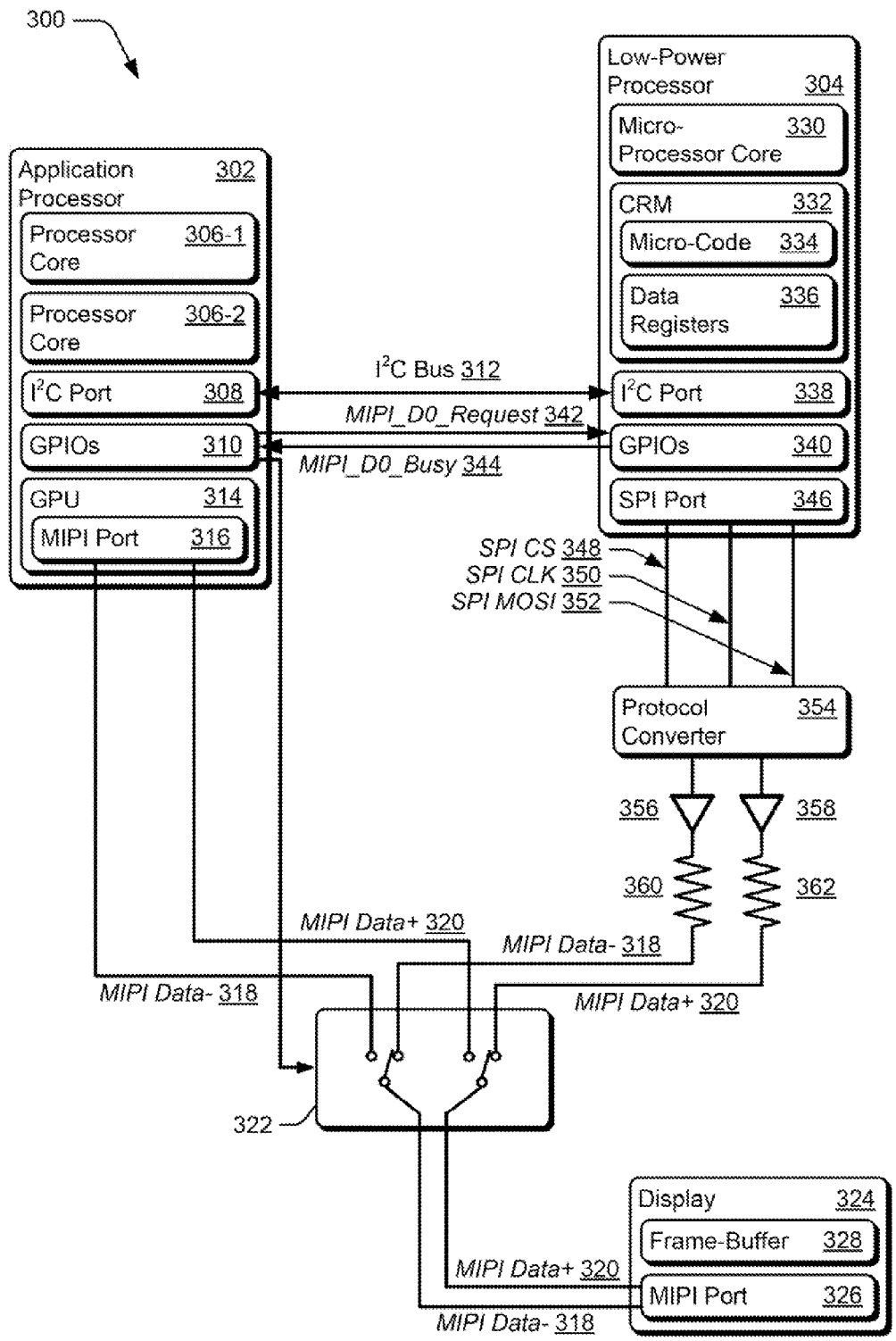
FIG. 3 illustrates various components of another example system that can implement embodiments of display co-processing.

FIG. 3 illustrates various components of another example system that can implement embodiments of display co-processing. As shown generally at 300, the components include an application processor 302 and a low-power processor 304, such as the application processor 104 and low-power processor 106 described with reference to FIG. 1. In this particular example, the application processor 302 is configured as a multi-core processor that includes two processor cores 306-1, 306-2. Either of these processor cores may execute code or instructions to implement an operating system, applications, or other functionalities of a computing device.

The application processor 302 also includes an I²C port 308 and general purpose input/output(s) 310 (GPIOs 310) for communicating data with other components. Alternately or additionally, the application processor 302 may communicate via other interfaces or interconnects, such as a SMBus, crossbar bus, SPI bus, and the like. In this particular example, the application processor 302 communicates with the low-power processor 304 via an I²C bus 312 and the GPIOs 308.

In some embodiments, a graphical processing unit 314 (GPU 314) is implemented by the application processor 302 for rendering display data. The GPU 314 may be implemented to perform specialized graphics processing, such as rendering polygons, three-dimensional shapes, shading, aliasing, encoding or decoding of video data, and the like. In some aspects, a processor core of the application processor may perform functionalities associated with a GPU. The GPU 314 may also support one or more display-specific data interfaces, such as MIPI, MDDI, DisplayPort, embedded DisplayPort, and so on. In this particular example, GPU 314 includes a MIPI port 316 for communicating display data via a MIPI compliant data bus. The MIPI compliant data bus comprises a MIPI data (−) signal line 318 and MIPI data (+) signal line 320 for communicating display data to a de-multiplexor 322. The de-multiplexor 322 can be implemented to enable a display 324 to receive display data from the application processor 302 and low-power processor 304. Input selection of the de-multiplexor 322 may be controlled via any suitable means, such as by one of the GPIOs 310 of the application processor 302 as shown in FIG. 3.

The display 324 receives display data from the MIPI compliant data bus via a local MIPI port 326. Once the display data is received, the display 324 stores the display data in a frame-buffer 328 from which the display data is converted into visual content for presentation. In some embodiments, the frame-buffer 328 includes display data sufficient to present a full resolution frame of visual content that occupies the entire viewable area of the display 324. A frame of visual content may include any suitable graphics, such as a background image, text, icons, battery status or charge level indicators, and the like. The frame-buffer 328 may be integral to the display 324 or external to the display.

The low-power processor 304 includes a micro-processor core 330 and integrated computer-readable media 332 (CRM 332). The micro-processor core 330 may be any suitable processing core, such as a 16-bit core executing a reduced complexity instruction set. The CRM 332 includes micro-code 334 and co-processing data registers 336 (data registers 336), such as the control registers 212 and status registers 214 described with reference to FIG. 2. The micro-code 334 can include firmware code or operating system instructions that are executable by the microprocessor core 330 to implement functionalities of the low-power processor, such as generating additional display data. The low-power processor 304 may lack a display controller or display-specific data interface, yet may be able to perform limited graphic processing such as rendering luminance information, colors, text, basic shapes and the like. Although the low-power processor 304 may not be able to render complex graphics, the low-power processor 304 is able to generate display data sufficient to alter visual content presented by the display 324.

The low-power processor 304 also includes an I²C port 338 and general purpose input/output(s) 340 (GPIOs 340) for communicating data with application processor 302. Alternately or additionally, the low-power processor 304 may communicate via other interfaces or interconnects, such as a SMBus, crossbar bus, SPI bus, and the like. In this particular example, the low-power processor 304 communicates with the application processor 302 via the I²C bus 312 and the GPIOs 340. The application processor 302 can write information to, or read information from, the data registers 336 via the I²C bus 312. As described with reference to FIG. 2, the data registers 336 may include control and status information for visual content presented by the display 324.

By way of example, consider the following tables that illustrate configurations of status registers associated with data and control registers for altering the display data. These registers can be utilized to coordinate low-power operation of the display between the application processor and the low-power processor.

TABLE 1

| Status Register (16-bit) | | | | |
|---|---|---|---|---|
| Reserved | Active Region | Reserved | Gamma (5 bits) | Panel State |
| 15-11 | 10-8 | 7 | 6-2 | 1-0 |

Table 1 illustrates a status register indicating an active region of a display, a current gamma index (of 32 gamma entries), and a state of the display panel. The states of the display panel may include: display off—sleep in, display off—sleep out, display on—sleep in (invalid), or display on—sleep out, where the sleep state refers to a power state of the application processor. The low-power processor may update the status register prior to transferring control of the display back to the application processor.

TABLE 2

| Control Register A (32-bit) | | | | | | |
|---|---|---|---|---|---|---|
| Reserved | Number of Regions | Reserved | Gamma | Panel State | Transition Delay (sec) | Off Time (×500 ms) |
| 31-27 | 26-24 | 23 | 22-18 | 17-16 | 15-8 | 7-0 |

Table 2 illustrates a control register indicating a number of display regions, a desired gamma index (of 32 gamma entries), a state of the display panel, and timing parameters for altering the gamma of the visual content. The transition delay may define a time delay (e.g., 0-256 milliseconds) between moving from one active region to a next active region. The off time may specify an amount of time (e.g., 0-128 seconds) between alterations of the visual content (e.g., breath cycles). The application processor can write information to the control registers that enables the low-power processor to alter the visual content of the display while the application processor is in a low-power state.

TABLE 3

| Control Register B (32-bit) | | | |
|---|---|---|---|
| Ramp Up Time (×100 ms) | Ramp Down Time (×100 ms) | Reserved | ActivePlateau Time (×500 ms) Region |
| 15-12 | 11-8 | 7-4 | 3-0 |

Table 3 illustrates another control register indicating timing parameters for altering the visual content. These timing parameters may accurately define a timing pattern for rendering cyclical alterations of the visual content (e.g., breath cycles). The timing parameters may include a ramp-up time (e.g., 0-1500 milliseconds), a ramp-down time (e.g., 0-1500 milliseconds), and a plateau time occurring between the respective ramp times (e.g., 0-8 seconds).

TABLE 4

| Regions Register (32-bit × 8) | |
| --- | --- |
| Partial Region Start Row | Partial Region End Row |
| 31-16 | 15-0 |

Table 4 illustrates a partial region register index. The register entries may be limited to beginning rows or ending rows of regions that are multiples of 16 to reduce a memory footprint of the region register. This may still provide approximately 80 unique start positions with a region of the display.

In some embodiments, the respective GPIOs can implement control signals for the display or display-specific data bus, such as MIPI_D0_Request 342 and MIPID0_Busy 344. The MIPI_D0_Request 342 signal may be used to wake or transfer control of the display 324 to the low-power processor 304. Alternately or additionally, the MIPI_D0_Busy 344 signal may be used to wake or transfer control of the display to the application processor 302. In some cases, these signals may be used to transfer control of the display-specific data bus (e.g., a MIPI bus) between the processors. In some embodiments, MIPID0_Request 342 and/or MIPI_D0_Busy 344 are used to indicate whether the low-power processor has control of the display-specific data bus.

Display data generated by the low-power processor 304 can be transmitted via a SPI port 346 over a SPI compliant data bus. In some aspects, the low-power processor 304 supports direct-memory access (DMA) enabling DMA transfers of display data from local memory (e.g., CRM 332) out of the SPI port 346. The signal lines of the SPI compliant data bus comprise SPI chip select 348 (SPI CS 348), SPI clock 350 (SPI CLK 350), and SPI master-out-slave-in 352 (SPI MOSI 352). In some embodiments, the display data is transmitted via the SPI compliant data bus to a protocol converter 354 for conversion to a display-specific communication protocol.

The protocol converter 354 may be implemented using any suitable combination of software, firmware, and/or hardware, such as a programmable logic device (PLD), field-programmable gate array (FPGA), complex PLD, programmable array logic (PAL), and the like. The protocol converter 354 is configured to convert display data transmitted via a generic data protocol into display data suitable for transmission via a display-specific protocol, such as MIPI. In some configurations, the protocol converter 354 may be operable coupled with line drivers 356, 358 and series resistors 360, 362 to meet signaling specifications of the display-specific protocol. In some embodiments, the protocol converter 354 may emulate handshake signaling or data transfer control operations of a display-specific interface (e.g. MIPI data transfer initiation/termination), such as shown by example in FIG. 4.

Figure 4:
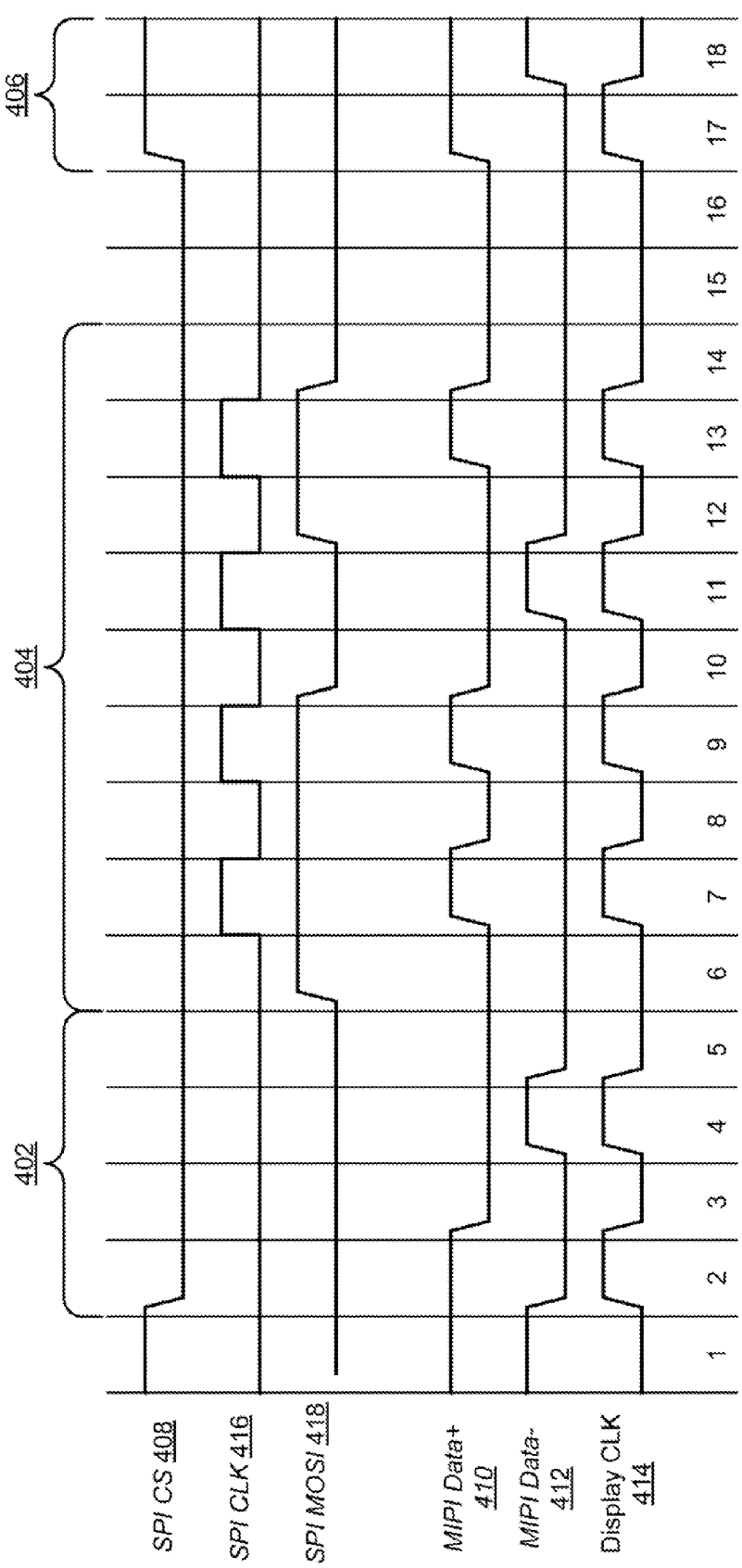
FIG. 4 illustrates an example timing diagram of protocol conversion in accordance with one or more embodiments of display co-processing.

FIG. 4 illustrates a timing diagram of example communication in accordance with one or more embodiments of display co-processing. In this particular example, display data is converted from SPI protocol to MIPI protocol for transmission to a display. The protocol conversion illustrated by FIG. 4 includes a MIPI initiation sequence 402, a data conversion interval 404, and a MIPI termination sequence 406. In the context of components shown and described with reference to FIG. 3, the conversion process can be initiated when the low-power processor 304 de-asserts the SPI chip-select signal line 408 to a protocol converter. Responsive to the de-assertion of the SPI chip-select signal line 408, the protocol converter signals a MIPI initiation sequence via outgoing MIPI data(+) 410 and MIPI data(−) 412 signal lines. A display receiving display data via the MIPI data(+) 410 and MIPI data(−) 412 signal lines can generate a local display clock 414 (display CLK 414) from transitions of the signal lines.

After de-asserting the SPI chip-select signal line 408, the low-power processor may delay transmission of the display data by an amount of time sufficient to allow the MIPI initiation sequence to complete. During the data conversion interval 404, the low-power processor transmits display data via the SPI clock signal line 416 (SPI CLK 416) and SPI master-out-slave-in signal line 418 (SPI MOSI 418). The protocol converter then converts the display data from SPI protocol to MIPI protocol as shown by the MIPI data(+) 410 and MIPI data(−) 412 signal lines in data conversion interval 404. Concluding the protocol conversion, the low-power processor can re-assert SPI CS 408 to cause the protocol converter to signal the MIPI termination sequence 406. In some aspects signaling the MIPI termination sequence is effective to cause the display to store the received display data in a local frame-buffer. This can be effective to cause visual content of the display to update based on the display data received from the low-power processor.

Returning to FIG. 3, the display data generated by the low-power processor 304 is converted and forwarded by the protocol converter 354 to the de-multiplexor 322. Here assume that application processor 302 has set the de-multiplexor 322 to receive data from the protocol converter 354. The display data is then received by the display 324 at the MIPI port 326 and stored in the frame-buffer 328. Storing the display data in the frame-buffer can be effective to cause visual content presented by the display to update based on the additional display data.

The protocol converter 354 then converts the additional display data from the SPI bus format to a display-specific communication protocol, in this case to MIPI compliant display data. The additional display data is then transmitted by the protocol converter 354 to the display 324 via the de-multiplexor 322. Once received by the display 324, the additional display data is written into the frame-buffer 328 effective to alter the visual content presented by the display 324. Having altered the visual content presented by the display 324, the low-power processor 304 can update the display status data in the data registers 336 to track a current state of alterations of the visual content. The application processor 302 may also access the data registers 336 to determine whether the low-power processor successfully altered the visual content or to determine whether to request further alterations.

Figure 5:
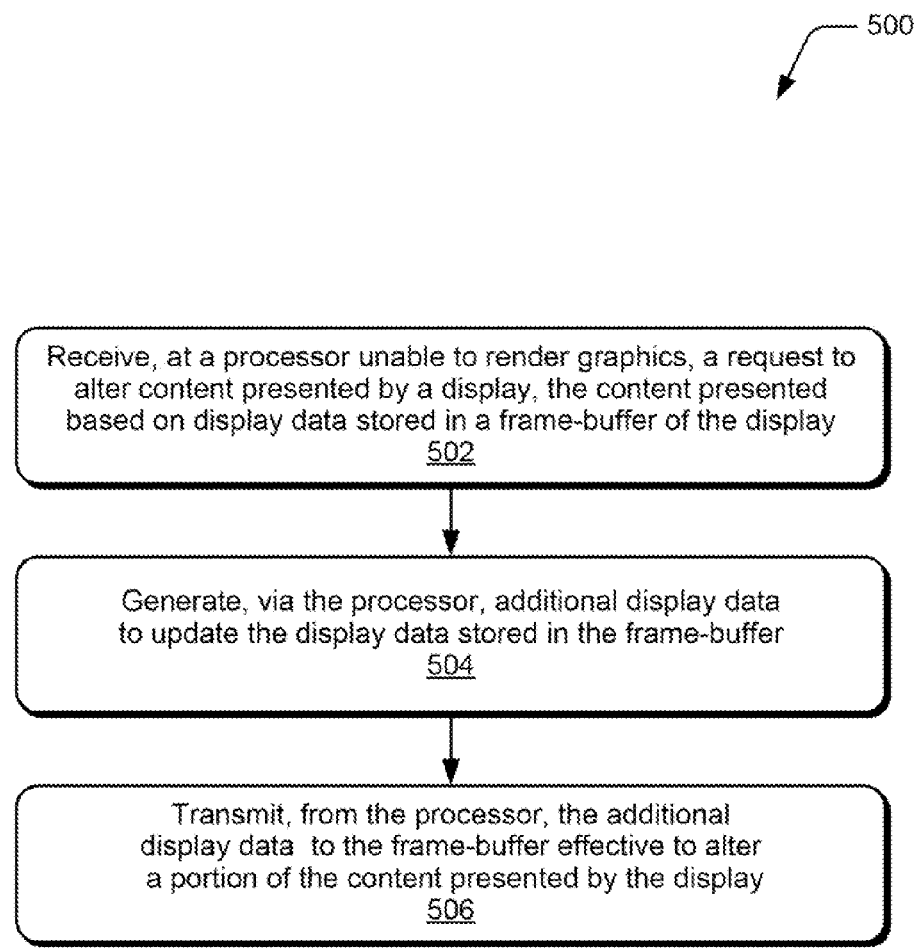
FIG. 5 illustrates an example method of display co-processing in accordance with one or more embodiments.

FIG. 5 illustrates an example method 500 of display co-processing. The order in which the method is described is not intended to be construed as a limitation, and any number or combination of the described method operations can be performed in any order to perform a method, or an alternate method for display co-processing.

At 502, a request to alter visual content is received at a processor that is unable to render graphics, such as a micro-controller or low-power processor. The visual content is presented by a display based on display data previously-stored in a frame-buffer of the display. For example, the display manager 216 of the computing device 102 can wake the low-power processor 204 or transfer control of the display 218 to the low-power processor 204. The visual content presented by the display 218 may be based on display data 220 stored in a frame-buffer of the display. In some embodiments, low-power processor 204 can access control data for altering the visual content through a set of control registers shared with an application processor.

In some embodiments the request or control data is received from a full-power processor that is capable of rendering graphics (e.g., application processor). This full-power processor may be in a low-power state which prevents the full-power processor from rendering updated display data. Alternately or additionally, the full-power processor may update the control data or transmit additional notifications while in the low-power state.

At 504, additional display data is generated at the processor to update the display data stored in the frame-buffer. The additional display data may include updated gamma or pixel data to alter visual content presented by the display. In some aspects, the processor may have limited graphic capabilities, and may generate additional display data to alter text or portions of an image within the visual content. The additional display data may be encoded or formatted in accordance with any suitable protocol, such as those compliant with SPI, SMBus, I²C, and the like.

At 506, the additional display data is transmitted from the processor to the frame-buffer of the display. This is effective to alter at least a portion of the visual content presented by the display. In some embodiments, the additional display data is transmitted using a generic communication protocol, such as SPI, SMBus, I²C, and the like. In such cases, the additional display data is transmitted via a protocol converter that is implemented to forward the additional display data to the frame-buffer using a display-specific protocol.

Figure 6:
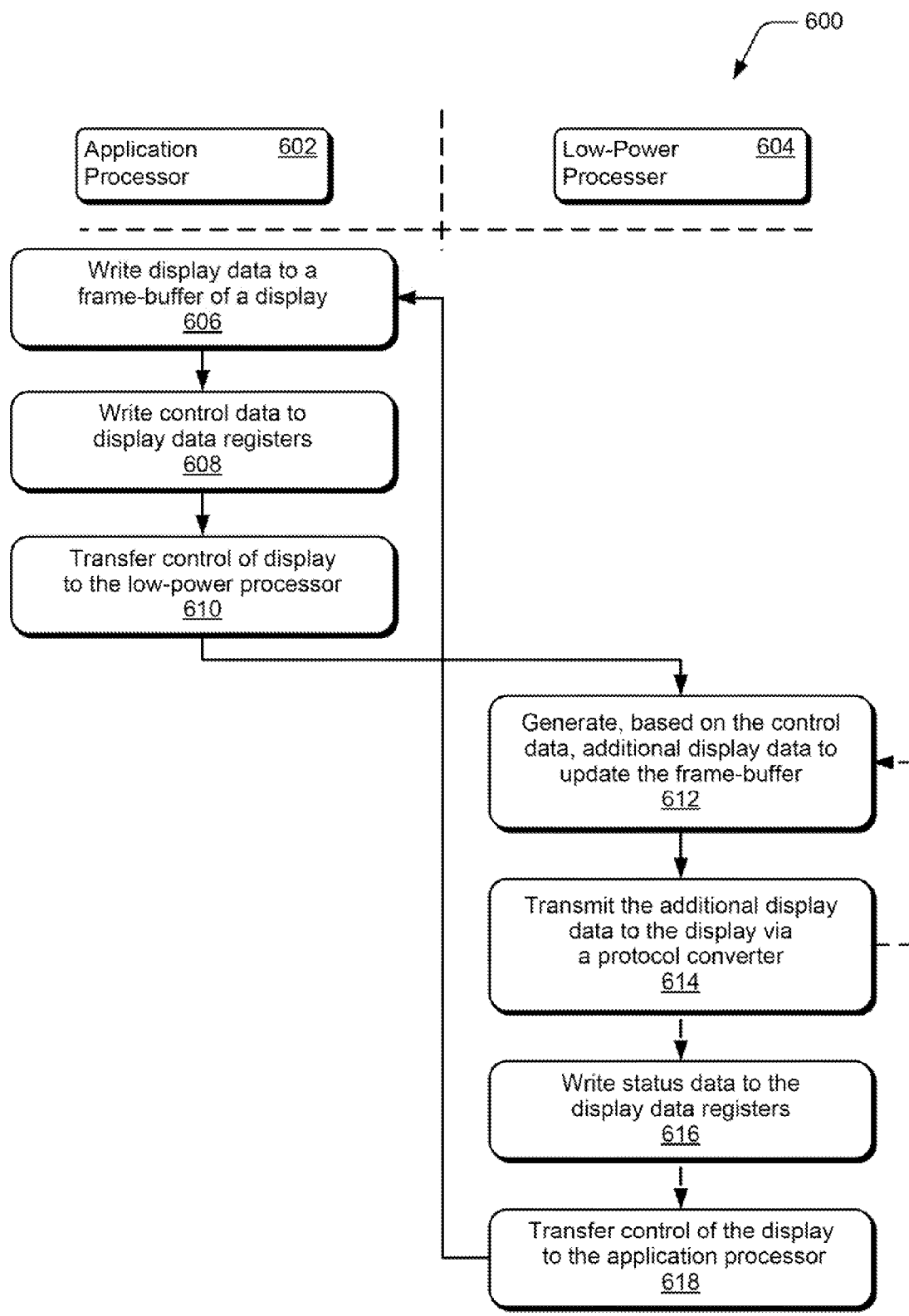
FIG. 6 illustrates another example method of display co-processing in accordance with one or more embodiments.

FIG. 6 illustrates another example method 600 of display co-processing. The order in which the method is described is not intended to be construed as a limitation, and any number or combination of the described method operations can be performed in any order to perform a method, or an alternate method for display co-processing. By way of example only, operations of method 600 are illustrated as being performed by an application processor 602 or a low-power processor 604 respectively, such as the application processor 104 and low-power processor 106 described with reference to FIG. 1. Alternately or additionally, any of the other components (e.g., display manager 218) described herein may perform any of the operations of method 600.

At 606, display data is written to a frame-buffer of a display. The display is configured to present visual content based on the display data stored by the frame-buffer. The display data may be transmitted by an application processor that rendered the display data. In some embodiments, the display data may include an entire frame of visual content that occupies an entire viewable area of the display, such as a frame of high-definition resolution. The display data may be encoded or formatted for transmission in compliance with a display-specific communication protocol or standard, such as MIPI, MDDI, DisplayPort, and the like.

At 608, control data is written to display data registers that are accessible by another processor. The display data registers may be implemented using shared memory, such as dual-port RAM or Flash. Alternately or additionally, the display data registers may be implemented in a memory of the other processor, such as a portion of memory accessible via a memory bus or I²C interface. The control data describes a desired alteration to visual content presented by a display. In some embodiments, the control data describes changes to a gamma or luminance of at least a portion of the visual content. The control data may also describe timing parameters for implementing alterations of the visual content.

At 610, control of the display is transferred to a low-power processor that is configured to alter the visual content presented by the display. In some cases, a request or notification is sent to the low-power processor via a data bus or GPIO. Transferring control of the display may enable the application processor to enter a low-power state or sleep mode. In some embodiments, the application processor pushes notifications or additional control data to the display data registers while in the low-power state. This can be effective to conserve power while enabling the low-power processor to update the visual content presented by the display.

At 612, additional display data is generated by the low-power processor. The low-power processor can generate the additional display data based on the control data stored in the display data registers. The additional display data may be useful to update at least a portion of the visual content presented by the display, such as a gamma or luminance of the visual content. In some aspects, the low-power processor may have limited graphic capabilities, and may generate additional display data to alter text or portions of an image within the visual content. The additional display data may be encoded or formatted in accordance with any suitable protocol, such as those compliant with SPI, SMBus, I²C, and the like.

At 614, the additional display data is transmitted to the display. In some embodiments, the additional display data is transmitted via a protocol converter. The protocol converter may be configured to forward the additional display data to the display using a display-specific data protocol or format, such as MIPI, MDDI, DisplayPort, and the like. Alternately or additionally, the additional display data may be transmitted through a de-multiplexor associated with a single interface of the display. This may be effective to enable multi-processor communication with the display without breaking out additional signal lines from the display.

From operation 614, method 600 may proceed to operation 616, or return to operation 612. At 612, the low-power processor may generate additional display data based on updated control data or generate additional display data for another region of the display. At 616, status data is written to the display control registers to reflect the status of the visual content that is written to the display. This status data may reflect whether a state of the display described by the control data was achieved by the low-power processor. For example, the status data may reflect if the low-power processor was able to alter one or more regions of visual content presented by the display.

Optionally at 618, control of the display is transferred to the application processor. Control of the display may be transferred to the application processor responsive to a computing device entering a state of high graphical activity, such as responsive to a user initiating an application. Alternately or additionally, control may be transferred to the application processor responsive to all regions of the display having been altered to their respective target states. For example, the low-power processor may transfer control of the display to enable the application processor to render another frame of display data to refresh the visual content of the display. In some embodiments, transferring control of the display between multiple processors is coordinated by a single entity, such as the display manager 216 described with reference to FIG. 2.

Figure 7:
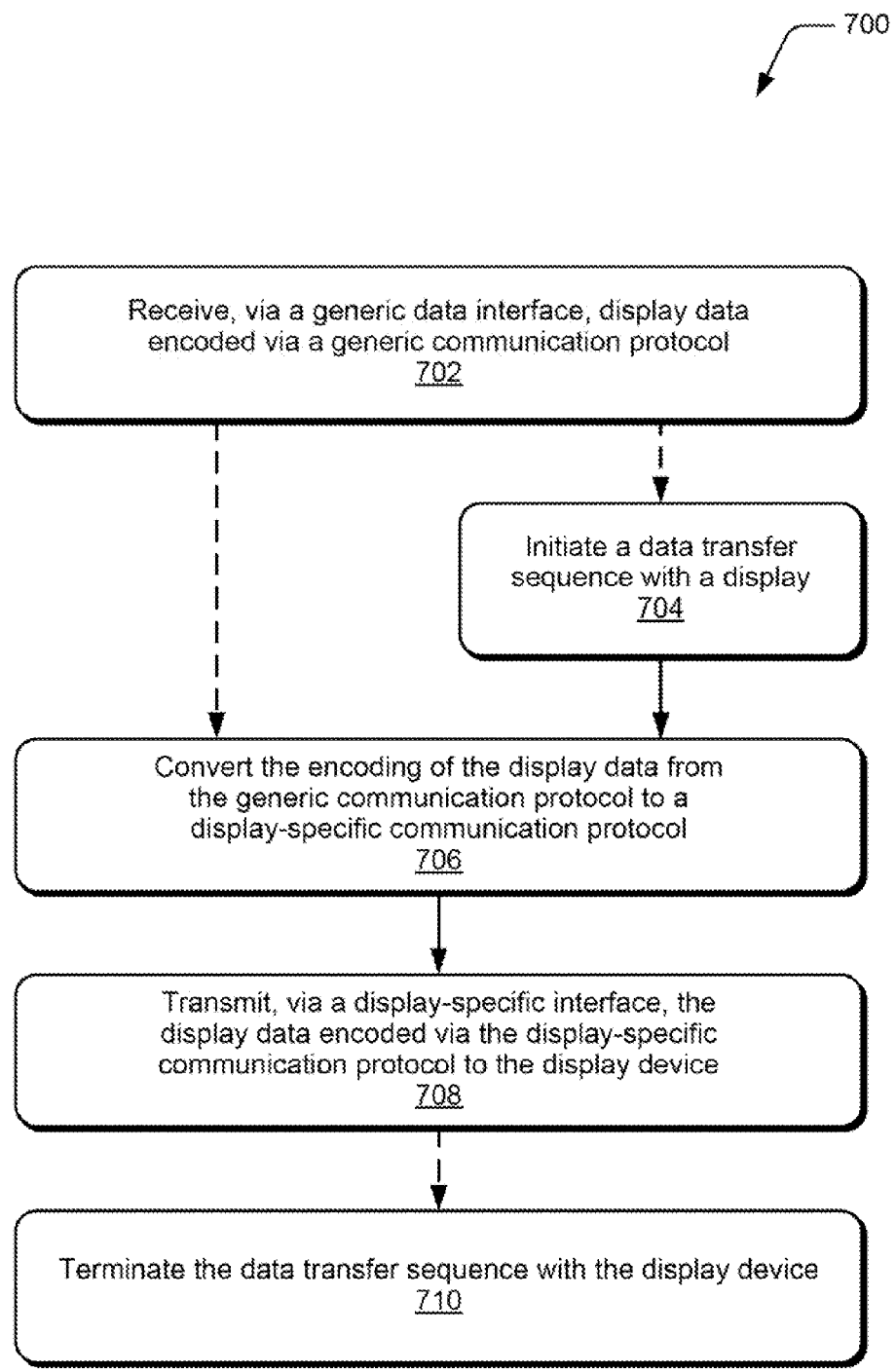
FIG. 7 illustrates an example method of protocol conversion in accordance with one or more embodiments.

FIG. 7 illustrates an example method 700 of protocol conversion in accordance with one or more embodiments. The order in which the method is described is not intended to be construed as a limitation, and any number or combination of the described method operations can be performed in any order to perform a method, or an alternate method for display co-processing.

At 702, display data is received via a generic data interface. The display data may be encoded or formatted in accordance with a generic data protocol, such as SPI, SMBus, I$^2$C, and the like. In some embodiments, the display data is received at a protocol converter configured to forward the display data to a display using a display-specific protocol, such as MIPI, MDDI, or DisplayPort protocols. For example, the display data may be received by protocol converter 228 described with reference to FIG. 2.

Optionally at 704, a data transfer sequence may be initiated with a display. The initiation of the data transfer sequence may be performed in compliance with a display-specific communication protocol, such as MIPI, MDDI, or DisplayPort. In some embodiments, a protocol converter may be configured to transmit a data sequence using logic blocks or counters to emulate timing of the display-specific protocol. Alternately or additionally, the initiation of the data transfer sequence may be responsive to an external signal, such as a de-assertion of a data line (e.g., SPI chip-select).

At 706, an encoding of the display data is converted from the generic communication protocol to be compliant with a display-specific protocol, such as MIPI, MDDI, or DisplayPort based protocols. The conversion may be performed using a protocol converter composed of programmable logic devices, hardware logic, timers, counters, and the like.

At 708, the display data encoded to be compliant with the display-specific communication protocol is transmitted to a display. In some embodiments, the display data is transmitted via line drivers or series resistors to match an expected impedance of a display-specific data interface. Transmission of the display data may be effective to cause visual content of the display to update based on the transmitted display data.

Optionally at 710, the data transfer sequence with the display is terminated. The termination of the data transfer sequence may be performed in compliance with a display-specific communication protocol, such as MIPI, MDDI, or DisplayPort. In some embodiments, a protocol converter may be configured to transmit a data sequence using logic blocks or counters to emulate timing of the display-specific protocol. Alternately or additionally, the termination of the data transfer sequence may be responsive to an external signal, such as a re-assertion of a data line (e.g., SPI chip-select).

Figure 8:
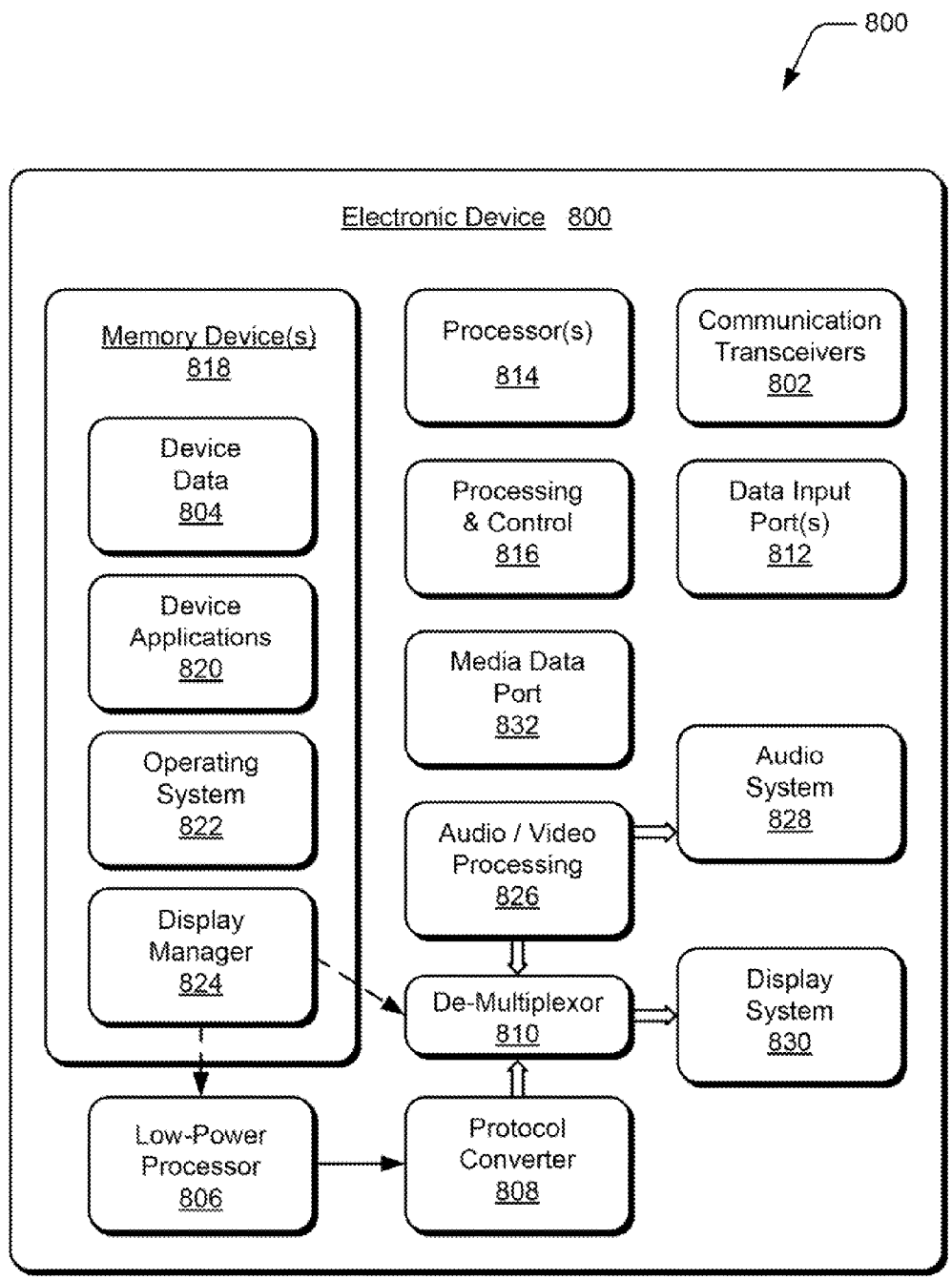
FIG. 8 illustrates various components of an example electronic device that can implement embodiments of display co-processing.

FIG. 8 illustrates various components of an example electronic device 800 that can be implemented as a computing device as described with reference to any of the previous FIGS. 1-7. The device may be implemented as any one or combination of a fixed or mobile device, in any form of a consumer, computer, portable, user, communication, phone, navigation, gaming, messaging, Web browsing, paging, media playback, and/or other type of electronic device, such as the computing device 102 described with reference to FIG. 1.

The electronic device 800 includes communication transceivers 802 that enable wired and/or wireless communication of device data 804, such as received data and transmitted data. Example communication transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN, 3GPP-compliant) radios for cellular telephony, wireless metropolitan area network (WMAN) radios compliant with various IEEE 802.16 (WiMAX™) standards, and wired local area network (LAN) Ethernet transceivers.

In embodiments, the electronic device 800 includes a low-power processor 806, such as the low-power processor 106 described with reference to FIG. 1. The electronic device 800 may also include a protocol converter 808 and a de-multiplexor 810, such as the protocol converter 224 and the de-multiplexor 228 described with reference to FIG. 2. The low-power processor 806, protocol converter 808, and de-multiplexor 810 can be implemented to facilitate display co-processing. For example, when the electronic device 800 enters a low-power state or low graphical activity, the low-power processor 806 can be leveraged to generate additional display data useful to alter visual content presented by a display of the electronic device 800.

The electronic device 800 may also include one or more data input ports 812 via which any type of data, media content, and/or inputs can be received, such as user-selectable inputs, messages, music, television content, recorded video content, and any other type of audio, video, and/or image data received from any content and/or data source. The data input ports 812 may include USB ports, coaxial cable ports, and other serial or parallel connectors (including internal connectors) for flash memory, DVDs, CDs, and the like. These data input ports may be used to couple the electronic device to components, peripherals, or accessories such as keyboards, microphones, or cameras.

The electronic device 800 of this example includes a processor system 814 (e.g., any of microprocessors, controllers, and the like), or a processor and memory system (e.g., implemented in an SoC), which process computer-executable instructions to control operation of the device. The processor system may be implemented as an application processor or full-power processor, such as application processor 104 described with reference to FIG. 1. A processing system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the electronic device can be implemented with any one or combination of software, hardware, firmware, or fixed logic circuitry that is implemented in connection with processing and control circuits, which are generally identified at 816. Although not shown, the electronic device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The electronic device 800 also includes one or more memory devices 818 that enable data storage, examples of which include random access memory (RAM), non-volatile memory (e.g., read-only memory (ROM), flash memory, EPROM, EEPROM, etc.), and a disk storage device. A memory device 818 provides data storage mechanisms to store the device data 804, other types of information and/or data, and various device applications 820 (e.g., software applications). For example, an operating system 822 can be maintained as software instructions with a memory device and executed by the processor system 814. In embodiments, the electronic device 800 includes a display manager 824, such as the display manager 216 described with reference to FIG. 2. Although represented as a software implementation, the display manager may be implemented as any form of a control application, software application, signal-processing and control module, firmware that is installed on the device, a hardware implementation of the controller, and so on.

The electronic device 800 also includes an audio and/or video processing system 826 that processes audio data and/or passes through the audio and video data to an audio system 828 and/or to a display system 830. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 832. In implementations, the audio system and/or the display system are external components to the electronic device. Alternatively or in addition, the display system can be an integrated component of the example electronic device, such as part of an integrated touch interface. As described above the low-power processor 806, protocol converter 808, and de-multiplexor 810 can be implemented to facilitate display co-processing of the display system 830. For example, when the electronic device 800 enters a low-power state or low graphical activity, the low-power processor 806 can be leveraged to generate additional display data useful to alter visual content presented by the display system 830 of the electronic device 800.

Although embodiments of display co-processing have been described in language specific to features and/or methods, the subject of the appended claims is not necessarily limited to the specific features or methods described. Rather, the specific features and methods are disclosed as example implementations of display co-processing.

The invention claimed is:

1. A method comprising:
   rendering and transmitting, by an application processor, display data to a display;
   causing, by a display manager based on a computing device entering a state of low graphical activity, the application processor to write data to control registers of the low-power processor and enter a low-power state;
   decreasing, by the display based on the computing device entering the state of low graphical activity, a refresh-frequency of visual content; and
   generating and sending to the display, by a low-power processor based on the computing device entering the state of low graphical activity and based on the data stored in the control registers by the application processor, additional display data to alter at least a portion of visual content presented by the display.

2. The method as recited in claim 1, wherein the application processor includes a graphics processing unit (GPU).

3. A method comprising:
   receiving, by a low-power processor from an application processor, a request to alter visual content presented by a display;
   generating, based on the request, additional display data to alter the visual content presented by the display;
   causing a protocol converter to initiate a data transfer session with the display, the protocol converter configured to forward data to the display using a display-specific communication protocol, the data transfer session including signaling a mobile industry processor interface (MIPI) compliant data transfer initiation sequence or a MIPI compliant data transfer termination sequence;
   transmitting, during the data transfer session, the additional display data to the protocol converter; and
   causing the protocol converter to terminate the data transfer session effective to cause the display to update the visual content based on the additional display data.

4. The method as recited in claim 3, wherein the MIPI compliant data transfer initiation sequence or MIPI compliant data transfer termination sequence comprises the MIPI compliant data transfer initiation sequence.

5. The method as recited in claim 3, wherein the MIPI compliant data transfer initiation sequence or MIPI compliant data transfer termination sequence comprises the MIPI compliant data transfer termination sequence.

6. The method as recited in claim 3, further comprising altering the visual content presented by the display by altering a luminance or gamma of at least a portion of the visual content.

7. The method as recited in claim 3, further comprising, prior to generating the additional display data, accessing additional information describing luminance and timing parameters for altering the visual content presented by the display.

8. The method as recited in claim 7, wherein the additional information is stored in data registers accessible by the low-power processor.

9. The method as recited in claim 3, further comprising transmitting, to the application processor, an indication of a status of the visual content presented by the display.

10. A system comprising:
    a display configured to present visual content based on display data stored in a frame-buffer;
    a first processor configured to, upon entry of the system into a low-power state, write data describing alteration of the visual content to control registers; and
    a second processor configured to:
        generate, based on the data written to the control registers, additional display data to update less than all of the display data stored in the frame-buffer; and
        write the additional display data to the frame-buffer of the display to alter at least a portion of the visual content presented by the display.

11. The system as recited in claim 10, wherein the first processor and the second processor write the respective display data and additional display data to the frame-buffer via a de-multiplexor operably coupled to a display-specific interface of the display.

12. The system as recited in claim 10, wherein:
    the second processor does not include a display-specific data interface,
    the system further includes a protocol converter configured to forward the display data to the display using a display-specific communication protocol, and
    the additional display data is communicated to the protocol converter that is configured to write the additional display data to the frame-buffer.

13. The system as recited in claim 12, wherein the additional display data alters a gamma or luminescence of the visual content.

14. The system as recited in claim 12, wherein the second processor is further configured to update display status registers to track alterations of the visual content.

15. The system as recited in claim 14, wherein the first processor is further configured to access the display status registers and determine whether to request further alterations to the visual content by the second processor based on the display status registers.

16. The method as recited in claim 1, wherein the data written to the control registers of the low-power processor by the application processor includes timing parameters for the low-power processor to alter the visual content.

17. The method as recited in claim 1, wherein the data written to the control registers of the low-power processor by the application processor includes an off time specifying an amount of time between alterations for the low-power processor to alter the visual content.

18. The method as recited in claim 1, wherein the data written to the control registers of the low-power processor by the application processor includes a partial region register index indicating a start position within a region of the display.

19. The method as recited in claim 1, further comprising the application processor pushing notifications to the low-power processor while the application processor is in the low-power state.

20. The method as recited in claim 1, further comprising:
   writing, by the low-power processor to status registers of the low-power processor, display status data tracking a current state of alterations of the visual content; and
   determining, by the application processor based on the status registers, whether the low-power processor successfully altered the visual content.

21. A system comprising:
a low-power processor configured to:
   receive, from an application processor, a request to alter visual content presented by a display;
   generate, based on the request, additional display data to alter the visual content presented by the display; and
   transmit, during a data transfer session, the additional display data to a protocol converter; and
the protocol converter configured to:
   initiate a data transfer session with the display, the data transfer session including signaling a mobile industry processor interface (MIPI) compliant data transfer initiation sequence or a MIPI compliant data transfer termination sequence;
   forward the additional display data to the display using a display-specific communication protocol; and
   terminate the data transfer session effective to cause the display to update the visual content based on the additional display data.

* * * * *